United States Patent
Kwan et al.

(10) Patent No.: US 9,159,121 B2
(45) Date of Patent: Oct. 13, 2015

(54) METHOD FOR IMAGE DENOISING

(71) Applicant: Signal Processing, Inc., Rockville, MD (US)

(72) Inventors: Chiman Kwan, Rockville, MD (US); Jin Zhou, North Potomac, MD (US)

(73) Assignee: SIGNAL PROCESSING, INC., Rockville, MD (US)

( * ) Notice: Subject to any disclaimer, the term of this patent is extended or adjusted under 35 U.S.C. 154(b) by 95 days.

(21) Appl. No.: 14/183,258

(22) Filed: Feb. 18, 2014

(65) Prior Publication Data

US 2015/0235350 A1   Aug. 20, 2015

(51) Int. Cl.
*G06K 9/36* (2006.01)
*G06T 5/00* (2006.01)

(52) U.S. Cl.
CPC ....... *G06T 5/002* (2013.01); *G06T 2207/10024* (2013.01); *G06T 2207/20021* (2013.01); *G06T 2207/20182* (2013.01)

(58) Field of Classification Search
CPC ......... G06K 9/40; G06K 9/44; G06K 9/6255; G06T 3/4015; G06T 3/4053; G06T 3/4084; G06T 5/002; G06T 5/003; G06T 5/20; G06T 2207/20012; G06T 2207/20028; G06T 2207/20192; G06T 2207/20204; H04N 9/045; H04N 2209/046
See application file for complete search history.

(56) References Cited

U.S. PATENT DOCUMENTS

| | | | | |
|---|---|---|---|---|
| 7,477,802 B2* | 1/2009 | Milanfar et al. | ............. | 382/299 |
| 7,889,950 B2* | 2/2011 | Milanfar et al. | ............. | 382/300 |
| 8,345,971 B2* | 1/2013 | Zhang et al. | ................. | 382/167 |
| 8,675,105 B2* | 3/2014 | Lansel et al. | ................. | 348/273 |
| 8,897,588 B2* | 11/2014 | Wang et al. | ................... | 382/255 |

OTHER PUBLICATIONS

Kostadin Dabov, Alessandro Foi, Vladimir Katkovnik, & Karen Egiazarian. Image Denoising by Sparse 3-D Transform-Domain Collaboratve Filtering, IEEE, Aug. 2007, vol. 16, No. 8.
Priyam Chatterjee & Peyman Milanfar. Patch-Based Near-Optimal Image Denoising. IEEE: Transactions on Image Processing, Apr. 2012, vol. 21, No. 4.

* cited by examiner

*Primary Examiner* — Jose Couso
(74) *Attorney, Agent, or Firm* — Ming Chow; Sinorica, LLC

(57) ABSTRACT

A method for removing noise from a noisy image includes a few important steps. The noise level of the noisy image is first estimated based on the smooth blocks of the image. The original image is divided into many small blocks. Each of these blocks is then converted from a two dimensional matrix to vector, which is a one dimensional array. The converted vectors are next grouped and then a matrix recovery process based on a principal component analysis (PCA) has been performed in order to remove the noise, wherein the key is to determine the number of principal components to retain during the denoising process. Next, the denoised vectors are converted back to the denoised blocks, and the denoised blocks are used to reconstruct a denoised image with a better image quality.

19 Claims, 20 Drawing Sheets

METHOD FOR IMAGE DENOISING

FIELD OF THE INVENTION

The present invention relates generally to the method of removing noise from an image. More specifically, it relates to a method for image denoising that does not need a user to select parameters and is applicable to all of gray, color and hyperspectral images.

BACKGROUND OF THE INVENTION

With the wide spread of all different types of image taking devices, including digital camera, cell phone, tablet computer and etc, images have been generated exponentially around the world. Now, image becomes an indispensable part of people's daily life, social activity and entertainment. The information included in a single image accounts for a huge quantity of words, and is more direct and more vivid. On the other hand, however, most of these pictures are not in good quality, which significantly affects their utilities. There are many factors accounting for the low quality of these images. Two major ones would be the hardware used for taking the image and the condition under which the image has been taken.

In most of the cases, the conditions under which people are taking pictures are not perfect. For example, the lighting condition may be too low or too high, the imaging device is shaking and so on. The weak signal under the low lighting condition would certainly compromise the image quality. In addition, the image device used for taking picture is not perfect, either. Many of them are not professional or dedicated device for image taking, such as the compact digital camera, cell phone and tablet computer. Currently, millions of digital images are collected using smart phones, iPads, tablets, etc. on a daily basis. Yet many of them are in low quality.

There are a few ways to improve the quality of the images. Of course, one of the most fundamental approaches would be to improve the performance of the image taking device and to adjust the lighting condition of the object. However, such approaches are either very costly (as for the professional image taking device), or infeasible (no way to change the lighting condition). In view of these issues, one of the most economical and effective method for improving image quality would be using an image editing software. The common image editing software comprising the function of denoising includes Adobe Photoshop, Adobe Lightroom, PhotoNinja and so on. However, most of the software is not capable of performing the denoising function in a satisfactory manner. They may either leave too much noise still in the processed image or remove too many details from the original image. Both of them are undesirable to the users.

Moreover, in most cases, these software programs or algorithms require users to choose the values of many parameters, including signal-to-noise ratio (SNR), contrast level, and so on. Nevertheless, for most of the normal users, they are not professional imaging editors. Even though they may understand what those parameters stand for, they still have no clue about what would be the optimal values for those imaging editing parameters, which need quite some experiences and skills or many times of trial and error. As a result, they may either waste certain time on setting those parameters, or just give it up. In light of the above issues, many common users cannot really benefit from such complex image editing software they bought.

In view of the foregoing, one objective of the present invention is to provide a method for denoising image, wherein this method is both easy to use (with no need to set the values of multiple parameters) and of a desirable performance (the resulted denoised image is of desired quality).

DETAILED DESCRIPTION OF THE INVENTION

Figure 1:
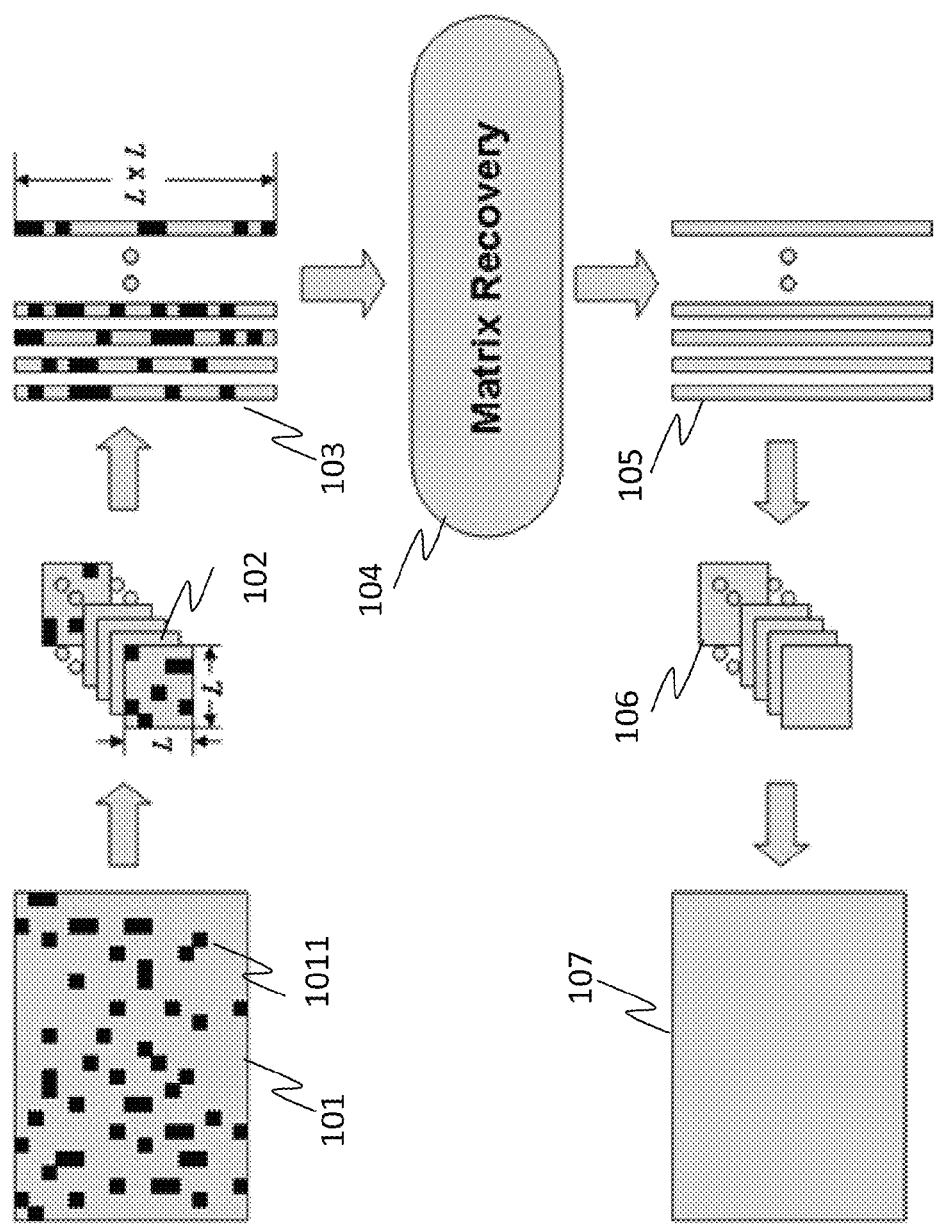
FIG. 1 is a schematic view of the denoising process of the present invention.
Figure 2:
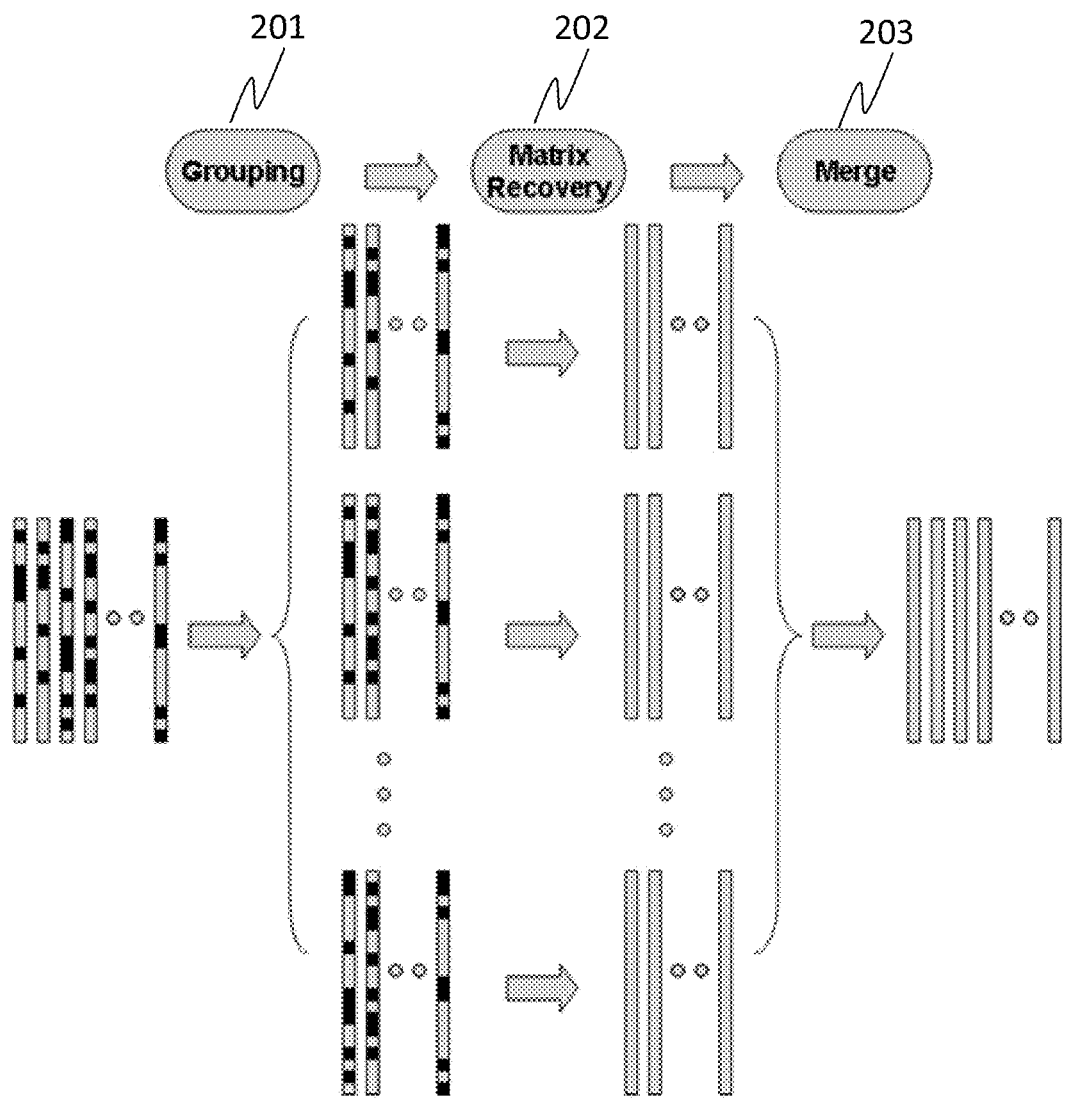
FIG. 2 is a schematic view of the process of grouped matrix recovery of the present invention.
Figure 3:
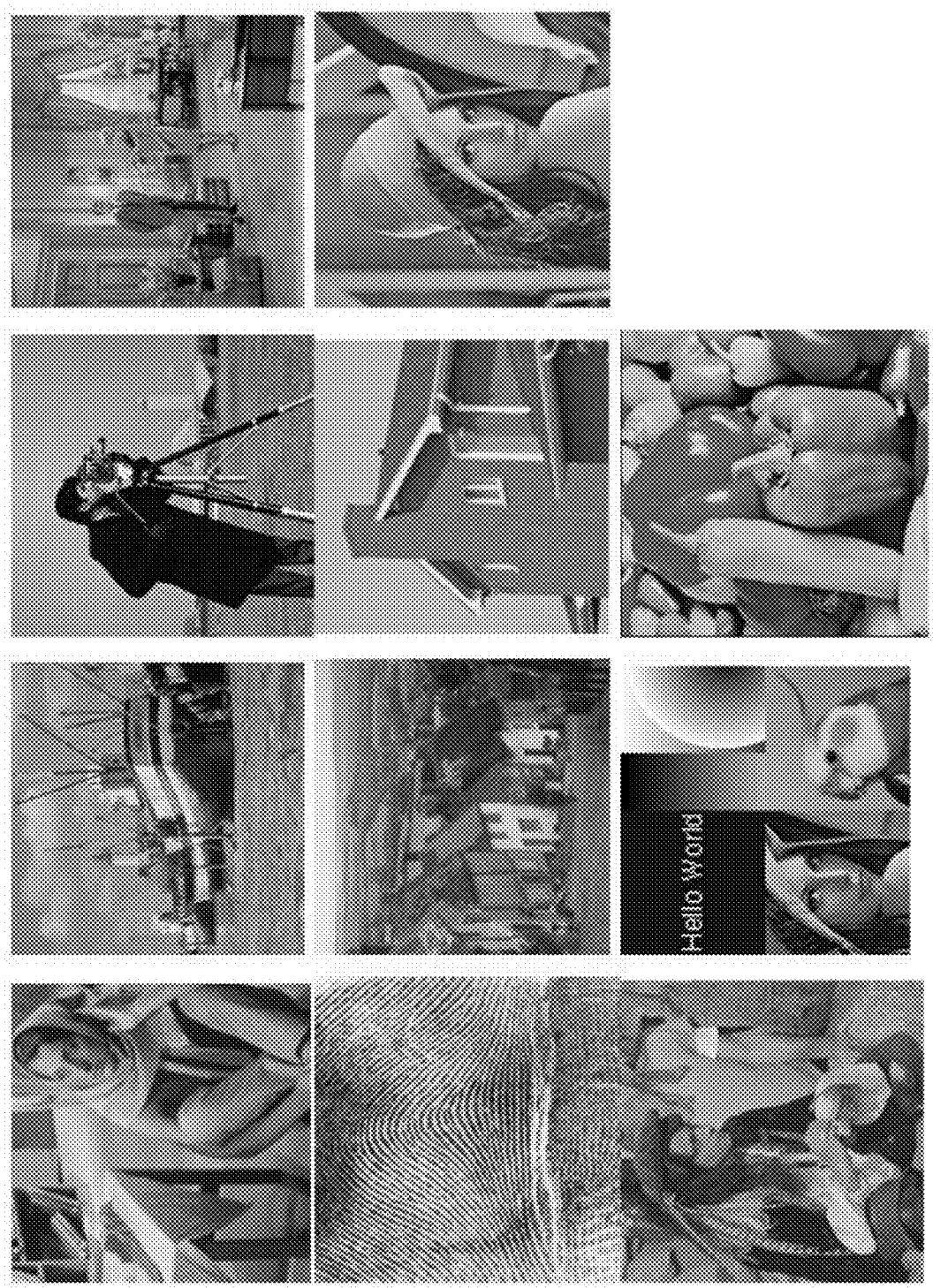
FIG. 3 shows the original clean gray images.
Figure 4:
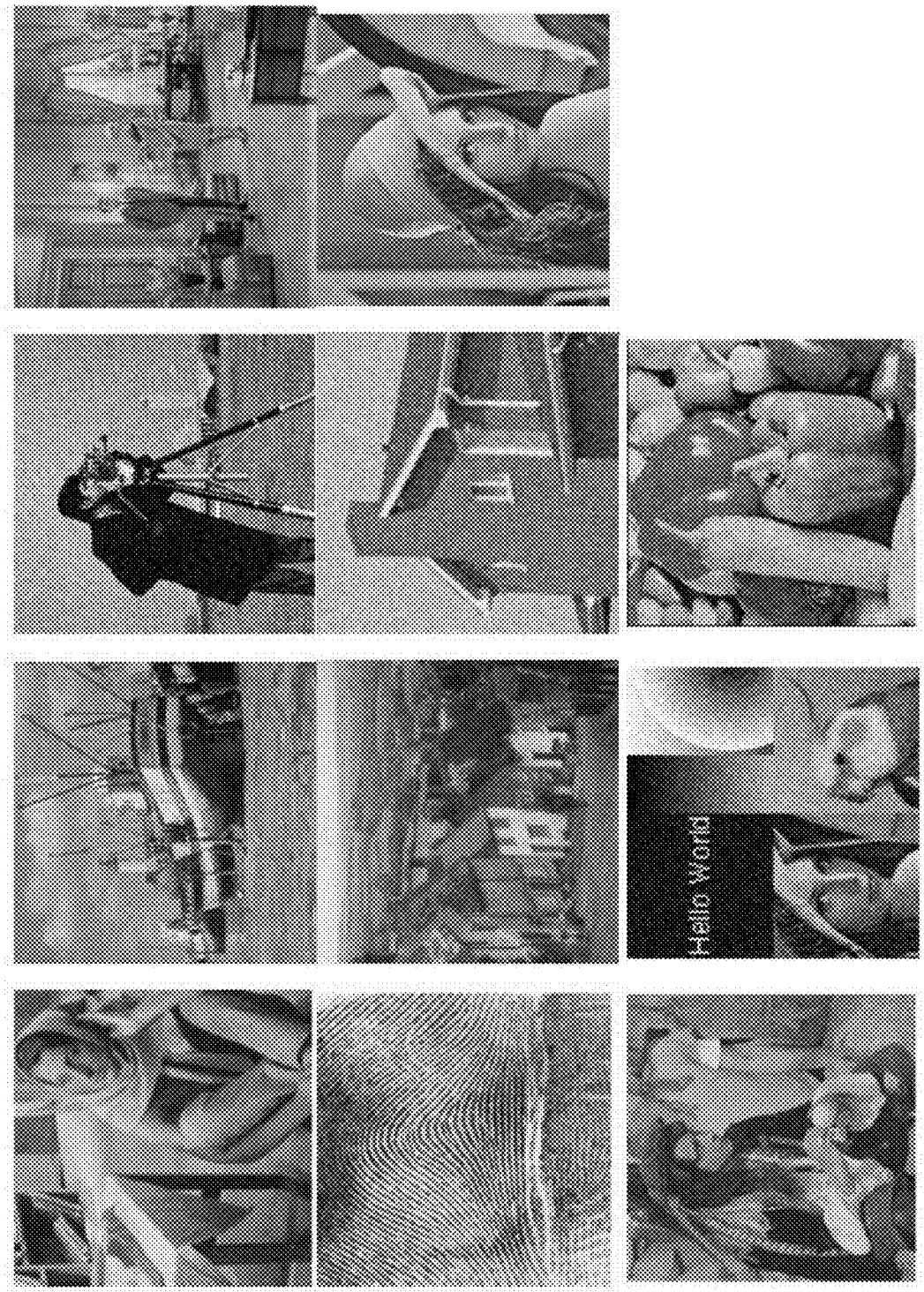
FIG. 4 shows the noisy gray images.
Figure 5:
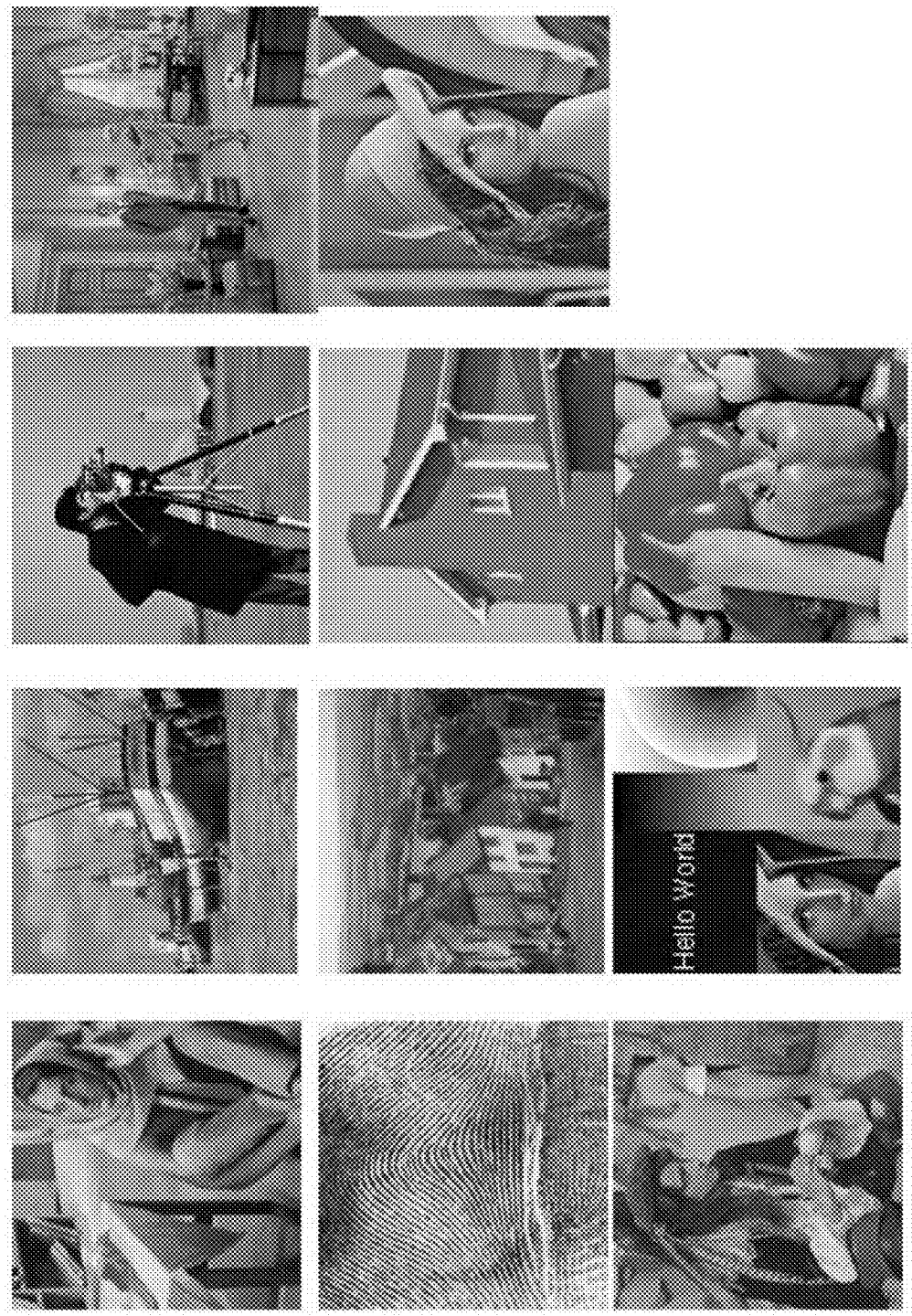
FIG. 5 shows the denoised gray images via the program of BM3D.
Figure 6:
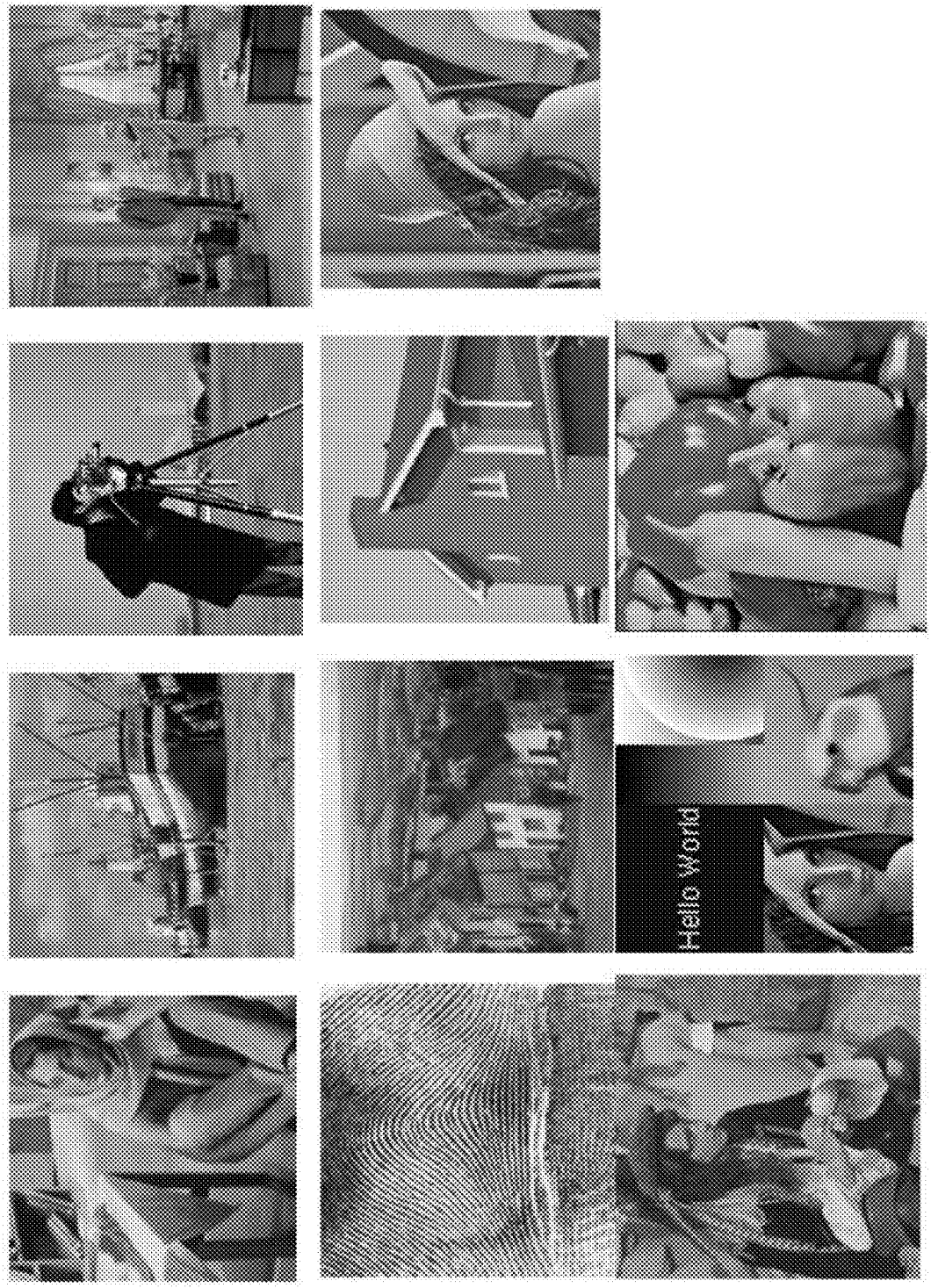
FIG. 6 shows the denoised gray images via the method of the present invention.

All illustrations of the drawings and description of embodiments are for the purpose of describing selected versions of the present invention and are not intended to limit the scope of the present invention.

As mentioned previously, there are many currently available software programs that are capable of performing denoising function and improve the quality of image. In comparison to these available programs, the present invention has a number of novel features and advantages.

The method adopted in the present invention to perform denoising is different from other image denoising techniques, such as Gaussian filtering, median filtering, wavelet based denoising and etc. The method disclosed in the present invention comprises the major components (process) set forth below: 1) automatic noise estimation via smooth area detection and variation statistics, 2) extracting small blocks that have similar characteristics; 3) block to vectors (points) conversion, 4) clustering (grouping) of vectors: two grouping methods have been developed based on data statistics; the methods are better than the conventional K-means algorithm;

5) matrix recovery based on principal component analysis (PCA); and 6) synthesis of the final image based on the recovered vectors.

In the present invention, the image noise is considered as the random (not present in the object imaged) variation of brightness or color information in an image, and is usually an aspect of electronic noise. It can be produced by the sensor and circuitry of a digital camera or scanner. Image noise can also originate in film grain and in the unavoidable shot noise of an ideal photon detector. Image noise is an undesirable by-product of image capture, which adds spurious and extraneous information.

The objective of the present invention is to provide an effective method to remove such noise from an image, so as to improve the quality of the image. The present invention will be further described in details in reference to the accompanying drawings. It is easily understood that in order to remove the noise from an image, it is first needed to know that in an image, which part is the noise and which part is the true information of the imaged object. Without such knowledge, it is impossible to perform any denoising process to remove the noise and retain the true signal.

In an ideal situation, the information of the object imaged is known. In such a case, via a simple comparison to the information of the imaged object, the noise level and what is the noise in that image would be easily obtained. However, in most practical situations, it is unknown what the true signal of the object is and what the noise is. In such a scenario, the information of an image's noise level needs to be determined or estimated in order to implement an appropriate denoising process. Since the ground truth image is not available, the real noise information is unknown and can only be obtained from a best guess or estimation. Therefore, in practice, one key step for denoising process would be noise estimation. In the present invention, a novel noise estimation method based on image blocks has been developed. This method contains the three steps set forth below: 1) selecting smooth blocks; 2) grouping smooth blocks based on mean pixel value and compute standard deviation (i.e. noise level) of each group; and 3) implementing nearest neighbor interpolation/extrapolation, such that, for each mean pixel value from 0~255, there is an associated noise level.

The smooth blocks are selected for noise estimation because the blocks containing rich texture could not be used to estimate noise. Noise could not be accurately estimated from those texture rich blocks, since it's hard to separate noise from the textures. The procedure for selecting smooth blocks further contains two steps: 1) smoothing the original noisy image (globally); and 2) for each block inside the smoothed image, compute the standard deviation. If the standard deviation is less than a pre-determined threshold, then it would be considered as a smoothed block.

In the second step, the blocks used for noise estimation are from the original noisy image. In this step, we first remove the blocks which are regarded as not smooth (or have texture inside) from the first step. Then for the remaining blocks, we compute the mean pixel value for each block and round it to an integer. The integer values are then used for grouping, i.e. blocks having the same integer value are considered as belonging to the same group. Lastly, for groups whose size is larger than 50, we compute the mean value of the standard deviation of each block, which are treated to be the noise level for this particular mean pixel value.

Following the aforementioned procedures, we have obtained the noise levels for different mean pixel values. For instance, for mean pixel value 25, the noise level is 10; for mean pixel value 26, the noise level is 12; for mean pixel value 40, the noise level is 8. Normally, we don't have noise level for all possible mean pixel values, which could be from 0 to 255. For those mean pixel values without their own noise estimations, we simply take the noise level of the mean pixel value that is the closest to it.

The final output is a noise level lookup table with index from 0 to 255. In matrix denoising step, we first compute the mean value of the whole matrix and then use the corresponding noise level from the lookup table. Following the estimation of an image's noise level, a noisy image is divided into many smaller blocks and each block will be vectorized. A particular algorithm is then applied to those vectors to remove noise. Finally, the smooth image is formed by merging all those smoothed blocks together. In general, in reference to FIG. 1, an inputted image (with noise) 101, wherein the black dots 1011 indicate the areas with high noises, is divided into a plurality of blocks 102. In the following step, each block would be converted into a vector (point) 103. The plurality of blacks would be grouped and then undergone a matrix recovery process 104 to remove noise 105. Next, each denoised vector is converted back to a corresponding denoised block 106 and finally merged to form a denoised image 107.

The number of the blocks is determined by image size, block size and step size. The block size and step size are design parameters. Suppose the image size is w in width and h in height, the block size is L×L and the step size is s. Then the number of blocks is $[(w-L+1)/s] \times [(h-L+1)/s]$. For example: if the image size is 10×20, L=5 and s=2, then block size is 5×5 and blocks will be extracted from position 1, 3, 5 horizontally and 1, 3, 5, 7, 9, 11, 13, 15 vertically. So in totally there are 3×8=24 blocks. The blocks are overlapped with overlapped size to be (L−s)×(L−s). The parameters of L and s are currently set as 10 and 2 in the present invention.

The next step is vectorization. It is the process of converting a 2D (two dimensional) matrix to a 1D (one dimensional) array. A block is a 2D image block. After vectorization, it becomes a vector. A vector is a point in high dimensional space. Basically, we first extract all the columns from the matrix and then concatenate all the columns to a single column. For example, matrix [1,2; 3,4] is converted to [1,3,2,4].

Points are grouped from clustering procedure. There is no fixed number of how many points in a group and the number of groups depends on which clustering method is used. In K-means method, the number of groups is a parameter predefined by user. In our software, we set K to be 256. Every point (vector) belongs to a group, and only belongs to a group. That is, there is no point that is not in a group; and there is no point that is in more than one group. In this way, the blocks are grouped 201.

In regard to the vector grouping, there are many methods for grouping/clustering. The most standard one is the K-means algorithm. The K-means clustering is a method of vector quantization originally from signal processing, which is popular for cluster analysis in data mining. The K-means clustering aims to partition n observations into K clusters in which each observation belongs to the cluster with the nearest mean, serving as a prototype of the cluster. This results in a partitioning of the data space into Voronoi cells. Given a set of observations (x1, x2, . . . , xn), where each observation is a d-dimensional real vector, K-means clustering aims to partition the n observations into K sets (K≤n) S={S1, S2, . . . , SK} so as to minimize the within-cluster sum of squares (WCSS). One problem of K-means is that the maximum number of clusters is fixed and it cannot be adapted to data. We developed two methods for grouping based on data statistics. Both of them do K-means first and then do hierarchical split on each cluster. The only difference is the splitting trigger. The pseudo code of the hierarchical splitting algorithm is the following:

```
function I' = split(M ,I) // where I(i) is the cluster index for ith column of M
  1. C = unique(I)
  2. I' = I
  3. for each c in C
  4.     o = (I == C(i)) // mask for ith cluster
  5.     continue if sum(o) < K // if the cluster size is already small, don't split
  6.     Mo = M (:,o)
  7.     if should_split(Mo)
  8.         oI = kmeans(Mo,2) // split to two groups
  9.         oI'= split(Mo,oI) // do hierarchical split
 10.         I'(o) = oI'+ max(I')
 11.     end
 12. end
```

Two algorithms have been developed for the should_split function. The first one is based on element-wise standard deviation of the mean normalized matrix. If the standard deviation is larger than noise standard deviation, we trigger the split event. The second algorithm is based on the PCA denoising algorithm. Basically, if calculated maximum number of principal components k is larger than 6, we trigger the split event.

In general, the original matrix is viewed as a combination of a set of vectors (points). The points are grouped and then for each group, a matrix recovery will be applied. Afterwards, the result of each group will be merged together to reconstruct the whole matrix, as well as the whole image.

The original matrix recovery approach can be regarded as a special case of the grouped matrix recovery, i.e. only a single group. The original matrix is formed by the vectors. The term original means it is the noisy data. The vector grouping brings many benefits. First, the matrix from the grouped points has much lower rank or has much smaller subspace than the original matrix. With grouped points, matrix recovery can be more stable and faster. Second, it divides a big problem to many small problems and thus naturally enables parallelization. It also reduces the memory use. In addition, when additional features are available, we can use additional features for grouping and thus embedding the external information for matrix recovery.

The matrix recovery 202 is one of the key procedures of the present invention. Specifically, the process of matrix recovery could be achieved via the steps set forth below:

step1: apply principal component analysis (PCA) to original matrix. We will get a mean vector m, three matrices U, S and V;

step2: based on noise level, estimate the number of principal components to keep. The output is an integer number k (number of principal components);

step3: recover the matrix using first k principal components:

$$X'=U_k S_k V_k m.$$

As mentioned in previous section, the points in each group are likely share similar characteristics. In geometry, they are close to each other. Based on this observation, we developed a matrix denoising approach based on the PCA approach.

Given a matrix which is corrupted by white Gaussian noise:

$$Y_{ij}=X_{ij}+n_{ij}$$

wherein n is the white Gaussian noise with standard deviation σ. From Y, we recover X based on PCA $$\hat{Y}=Y-me^T$$

$$[U,S,V]=svd(\hat{Y})$$

$$k=f(\text{diag}(S),\sigma)$$

$$\bar{X}=U(:,1:k)S(1:k,1:k)V(:,1:k)^T$$

Basically, all the principal components will be computed and then project points to several most important principal components to remove the noise. The key step is determining the number of principal components to keep. In our algorithm, this is based on the standard deviation of the noise. The pseudo code is

```
function k = f (s, (σ)
  1. k = length(s)
  2. T = nσ² // n is the number of elements of Y
  3. while sum(s(k : end)) < T
  4.     k = k - 1
  5. end
``` wherein, Y: original noisy matrix, $Y_{ij}$: the value of the pixel at $i^{th}$-row and $j^{th}$ column, X: ground truth clean matrix, n: noise, m: mean of vectors of Y, e: a vector with each element is 1, U, S, V: results generated by Singular Value Decomposition process, k: an integer value indicating how many principal components to keep, and X bar: recovered matrix.

Later on, the groups will be merged back to a matrix. For each vector in the group, it has a corresponding column position in the matrix. We put this vector to the corresponding column in the matrix. We do this for every vector in every group.

Converting vector back to block is the reverse process of converting block to vector, i.e. vectorization. Basically, for a vector with length L^2, we cut it to L pieces with each piece has length L. Then we put each piece to a column in the block, which has L columns. The smoothed blocks will be merged back. Merging the smoothed blocks is the reverse process of extracting the blocks 203. First, we create an empty image with all pixel value to be zero. For each element in a smoothed block, it has a corresponding pixel in the image. In the second step, we add each element to the corresponding pixels in the image and we do this for all smoothed blocks. In the third step, we compute average of each pixel by dividing the accumulated pixel value by the number of blocks overlapped on this pixel.

It is noted that in the simulation of the present invention, Gaussian noise has been utilized. This is a common practice in image denoising community to use this type of noise for comparative studies. In reality, the noise can be any type. For some images collected under low lighting conditions, the noise characteristics are quite different from Gaussian noise. For images under low lighting conditions, most if not all conventional methods do not perform well. It should also be noted that the method disclosed in the present invention does not require the noise type to be Gaussian; the noise can be any type.

With the method set forth above, the present invention comprises a few key advantages: 1) it is applicable to various types of images, including gray, color, and hyperspectral images; 2) it has an excellent denoising performance in noisy and low lighting conditions; 3) it is user friendly and easy to use, with its one click solution, users do not need to choose multiple parameters that they may not be familiar with; 4) it is able to automatically estimate SNR; and 5) it is also able to deal with missing pixels in images, the missing pixels could be formed due to pixel saturation or noise.

In comparison to the denoising result from other currently available programs, the denoising effect of the present invention is superior to most of them.

Figure 7:
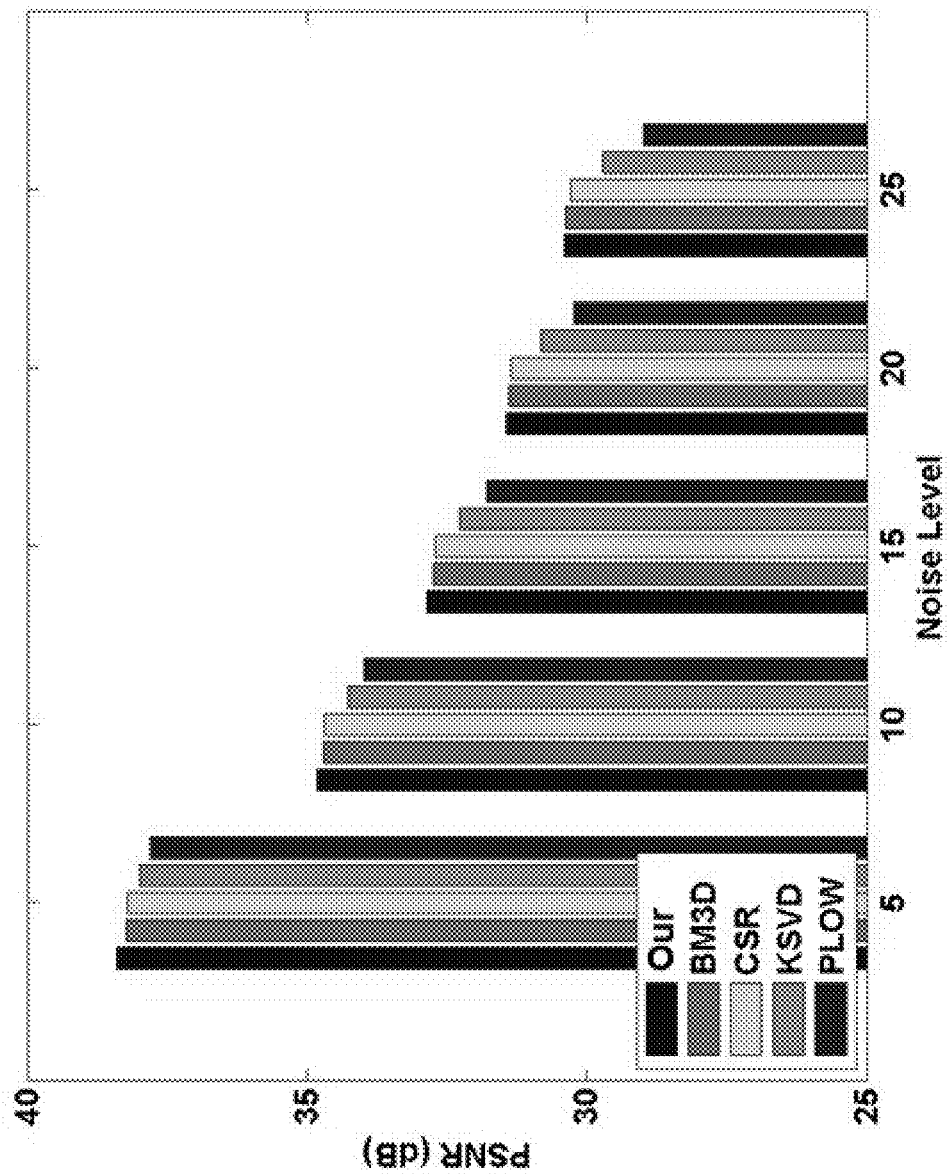
FIG. 7 is a comparison of the denoising performances of different denoising programs to the gray images, including the method of the present invention.
Figure 8:
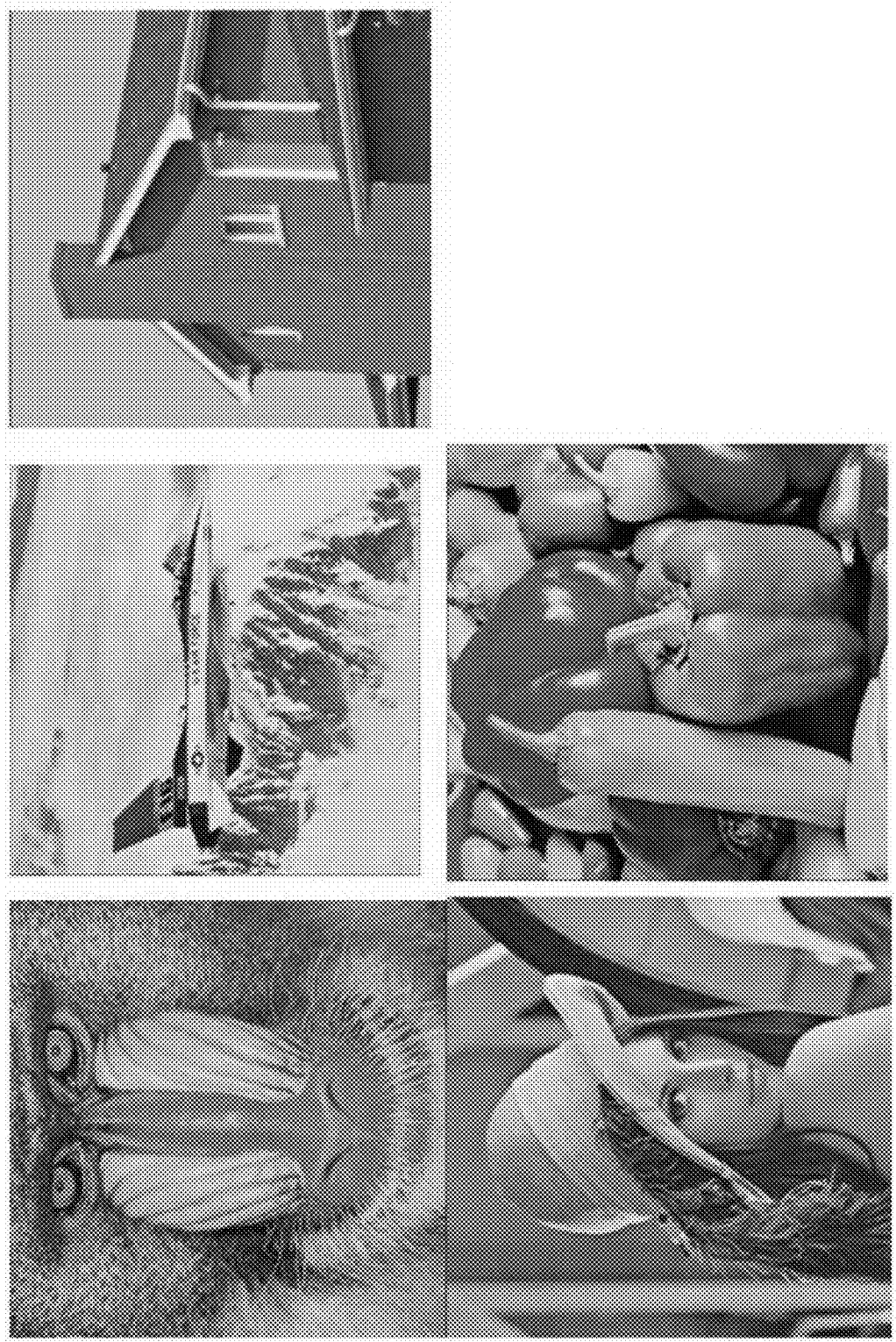
FIG. 8 shows the original clean color images.
Figure 9:
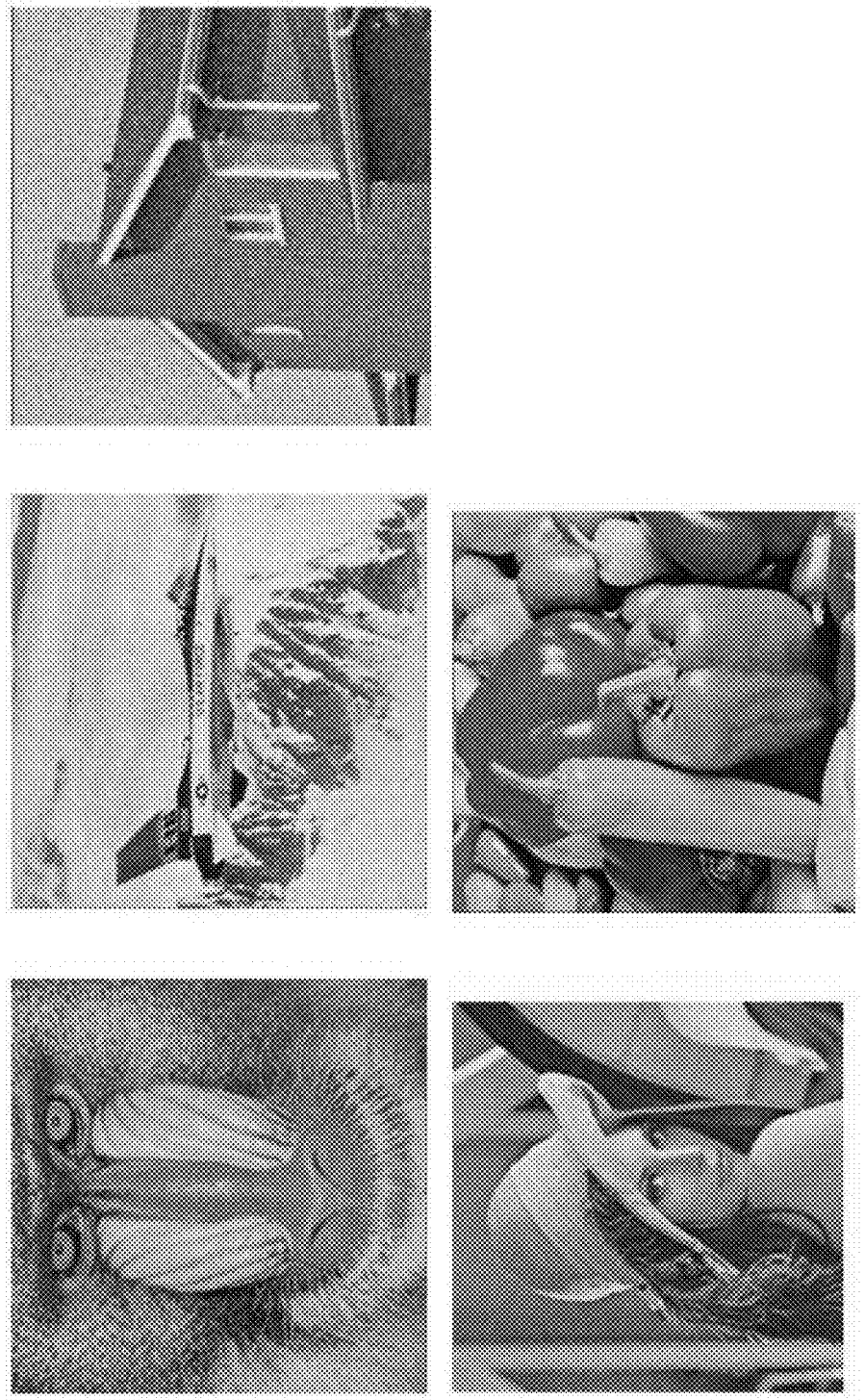
FIG. 9 shows the noisy color images.
Figure 10:
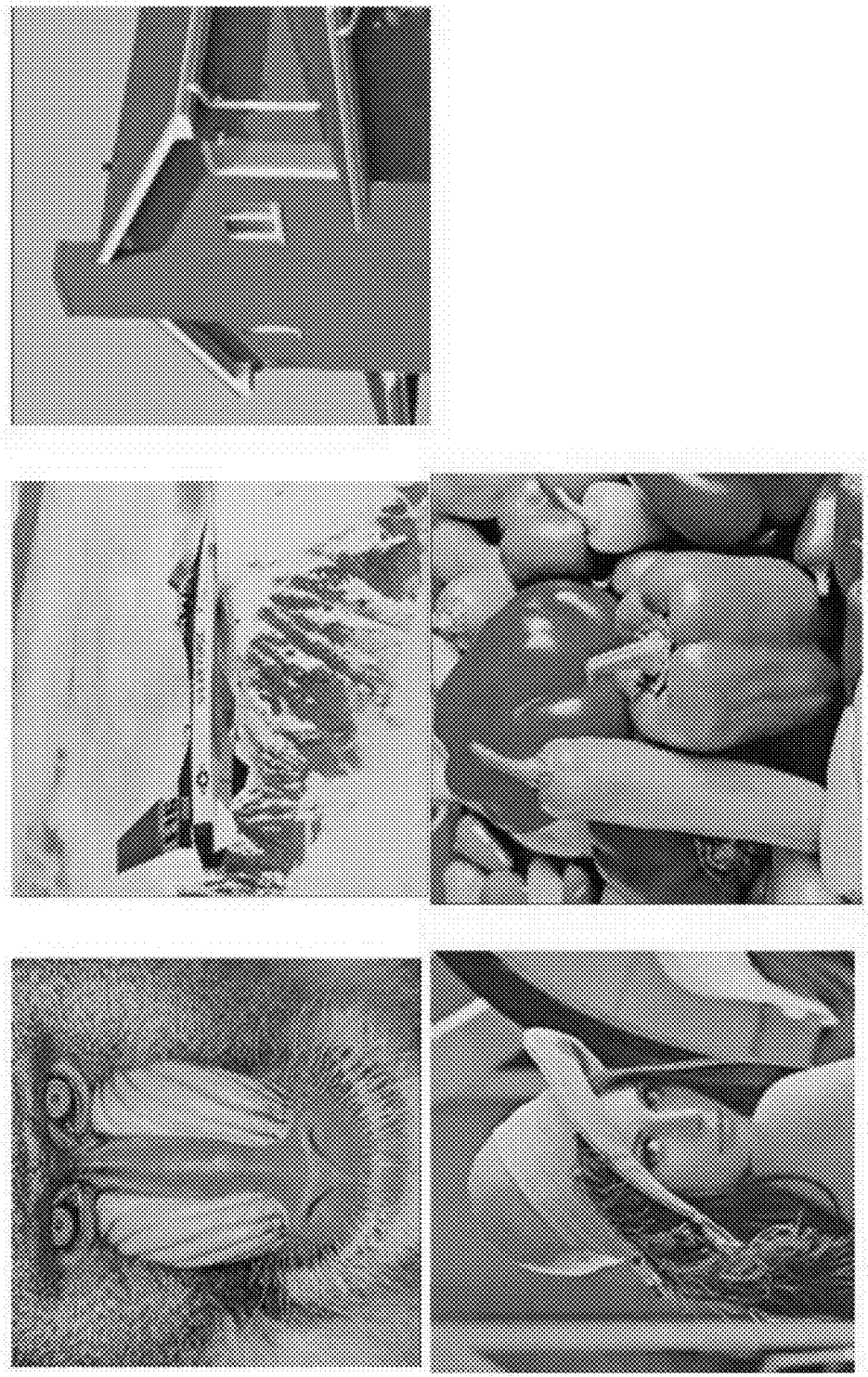
FIG. 10 shows the denoised color images via the program of BM3D.
Figure 11:
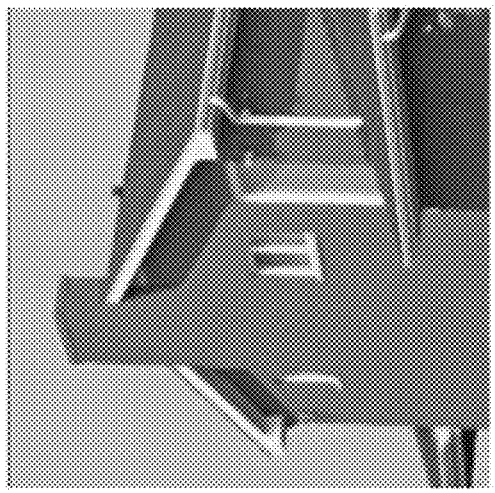
FIG. 11 shows the denoised color images via the method of the present invention.
Figure 11:
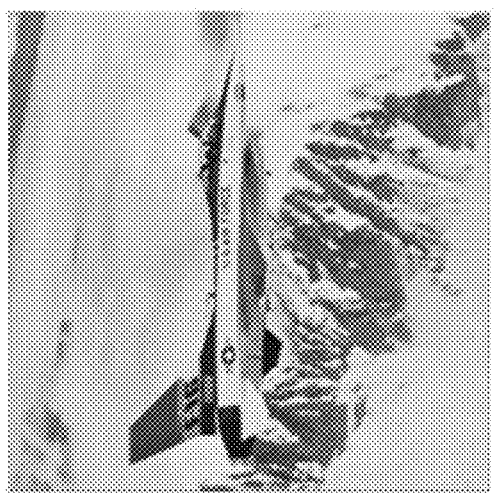
Figure 11:
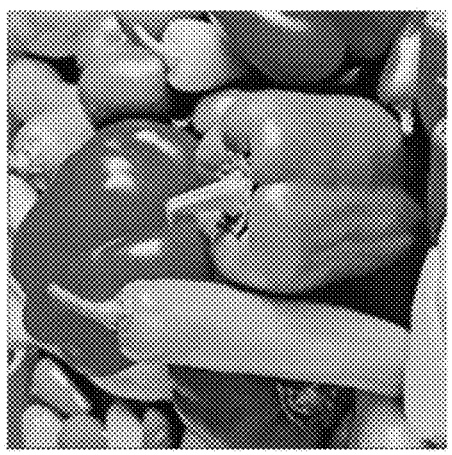
Figure 11:
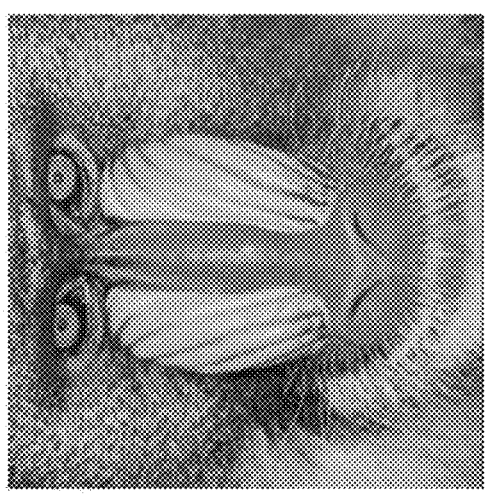
Figure 11:

In the case of gray image denoising, the method disclosed in the present invention has been applied for image denoising and compare with other state of the art methods like BM3D, CSR, KSVD and PLOW. Total 11 gray scale images (Barbara, Boat, Cameraman, Couple, Fingerprint, Hill, House, Lena, Man, Montage, and Peppers) are used, which are from the code package of BM3D. 5 noise levels (standard deviation of the Gaussian noise σ=5, 10, 15, 20, and 25) are tested. FIG. 3 to FIG. 6 show the clean gray images, noisy gray images, denoised images using BM3D, and denoised images using our algorithm (GPCA), respectively. FIG. 7 shows the average PSNR comparison plot for 11 benchmark images. Basically, our results are better than all other methods.

Figure 12:
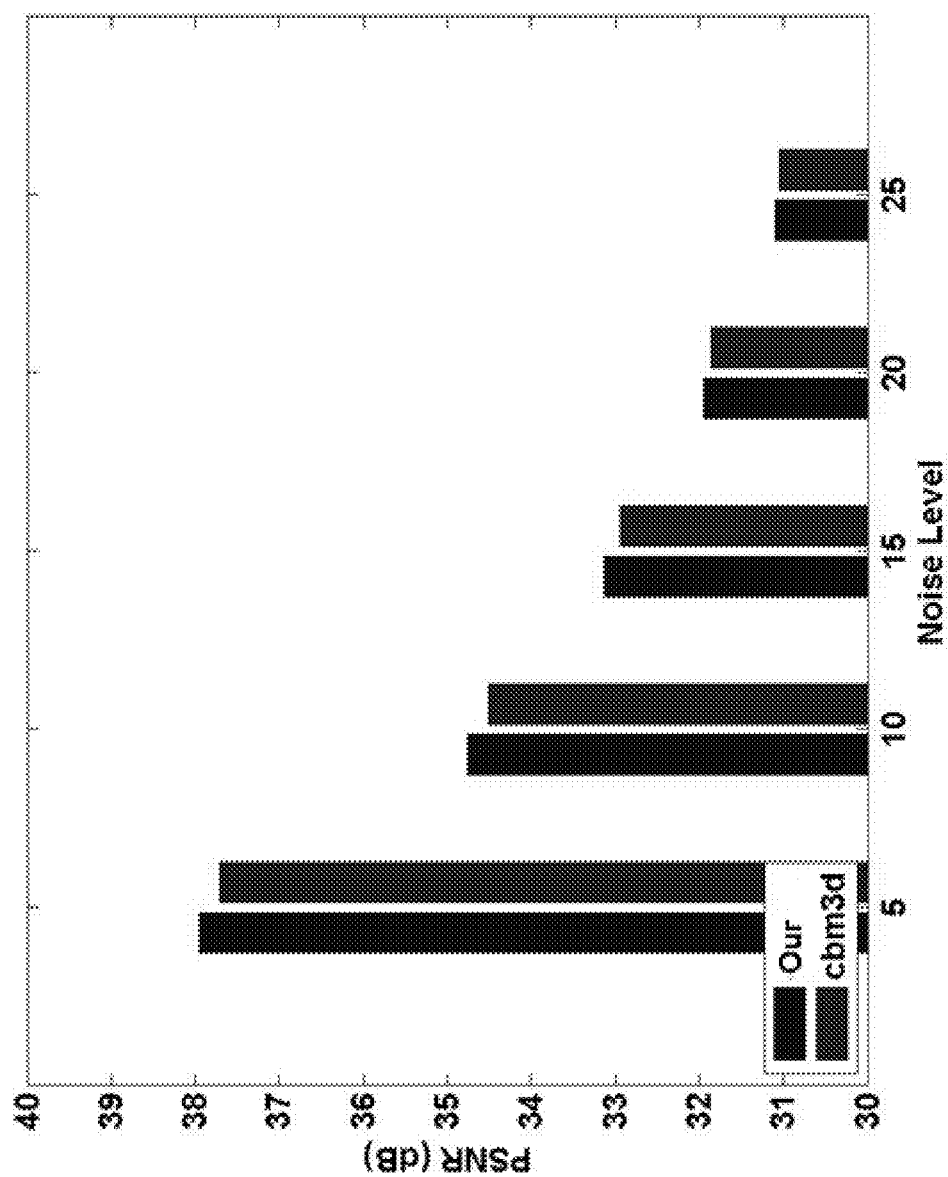
FIG. 12 is a comparison of the denoising performances of different denoising programs to the color images, including the method of the present invention.
Figure 13:
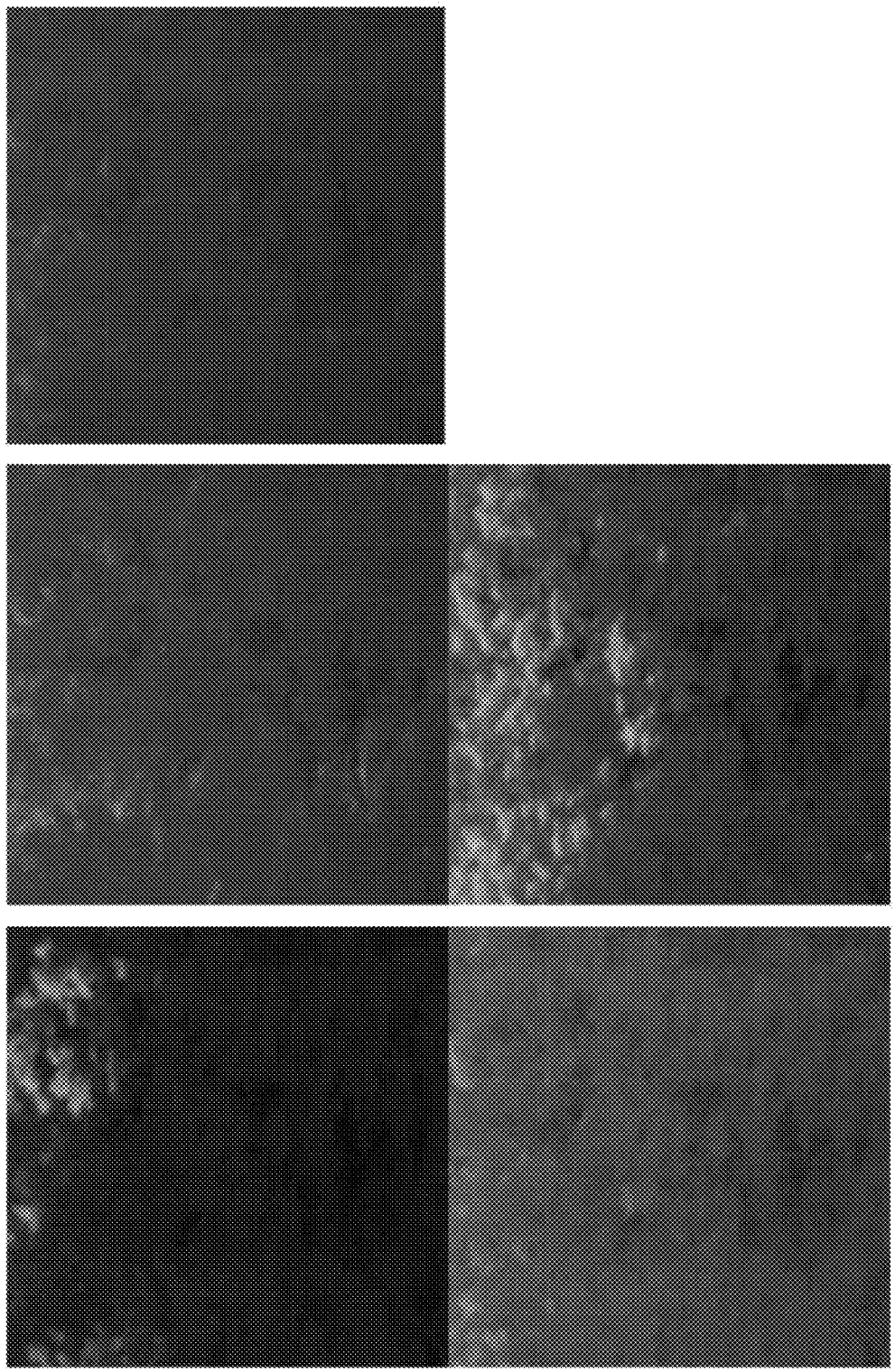
FIG. 13 shows the original hyperspectral images.
Figure 14:
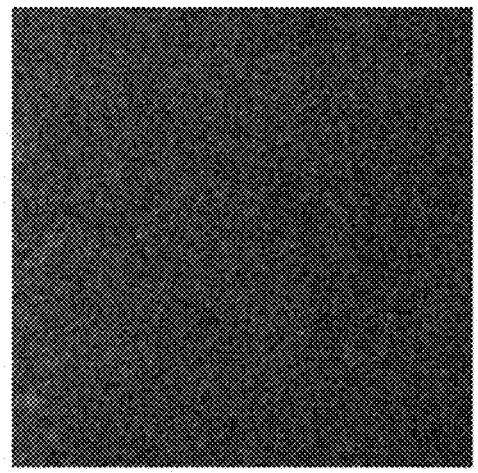
FIG. 14 shows the noisy hyperspectral images.
Figure 14:
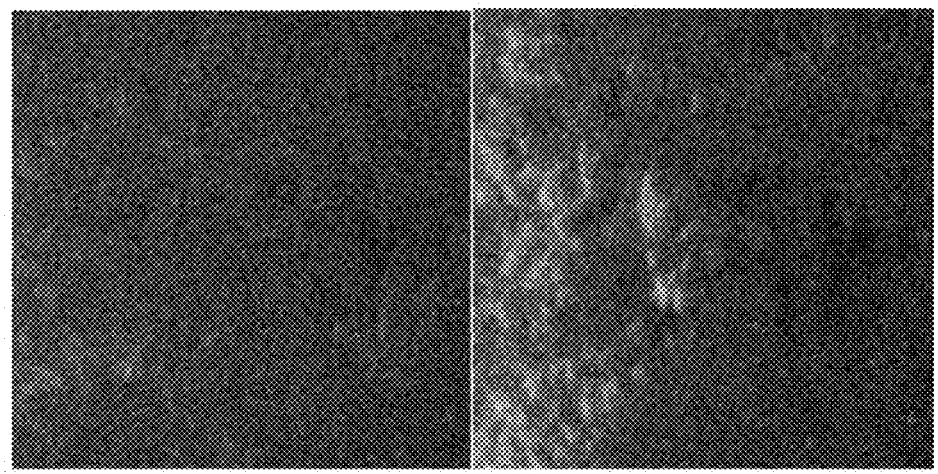
Figure 14:
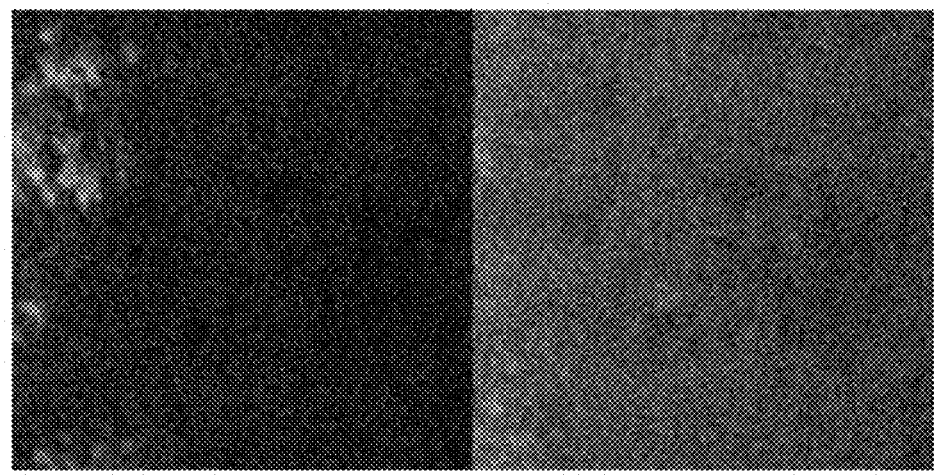
Figure 15:
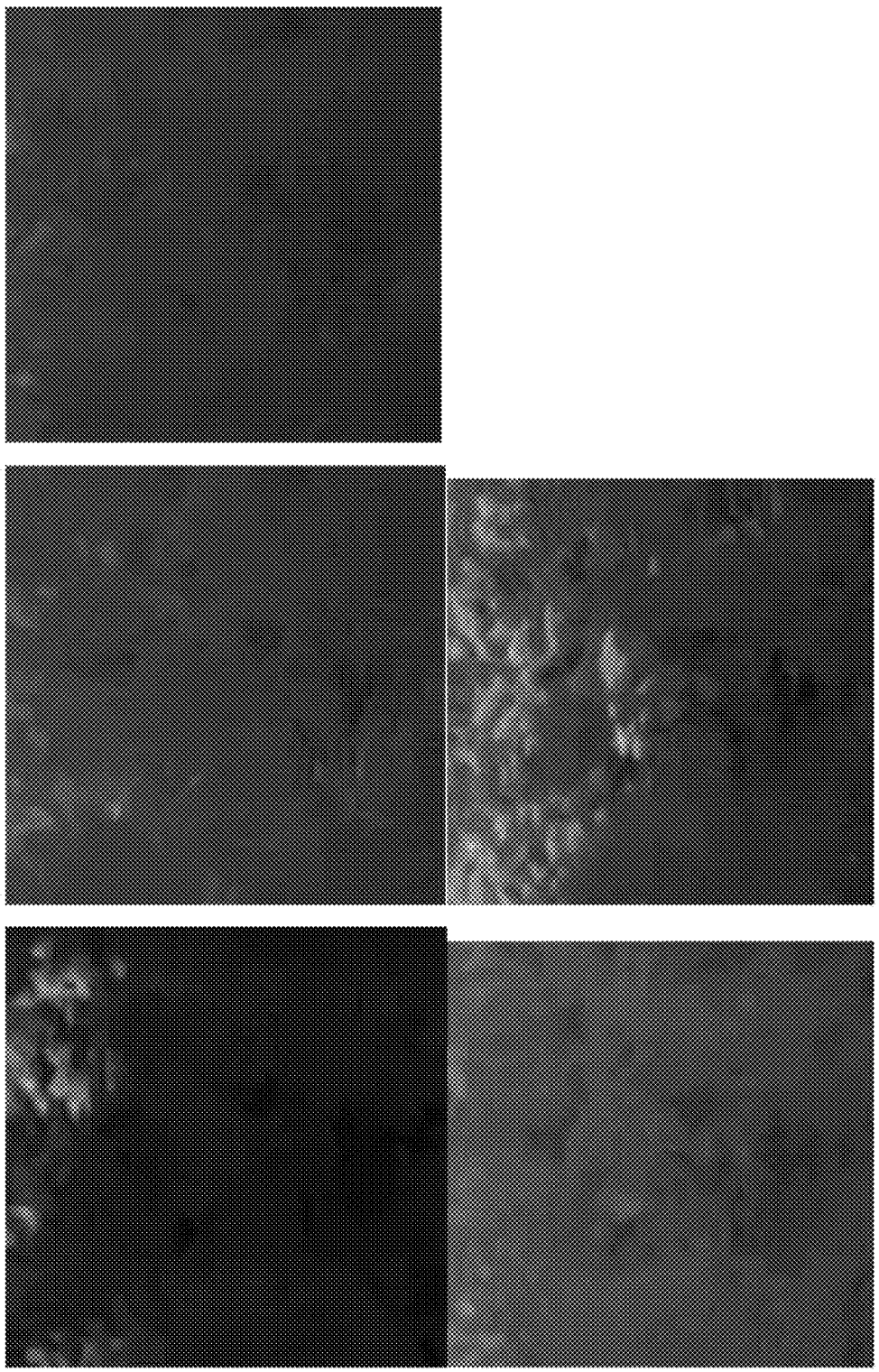
FIG. 15 shows the denoised hyperspectral images via the program of BM3D.
Figure 16:
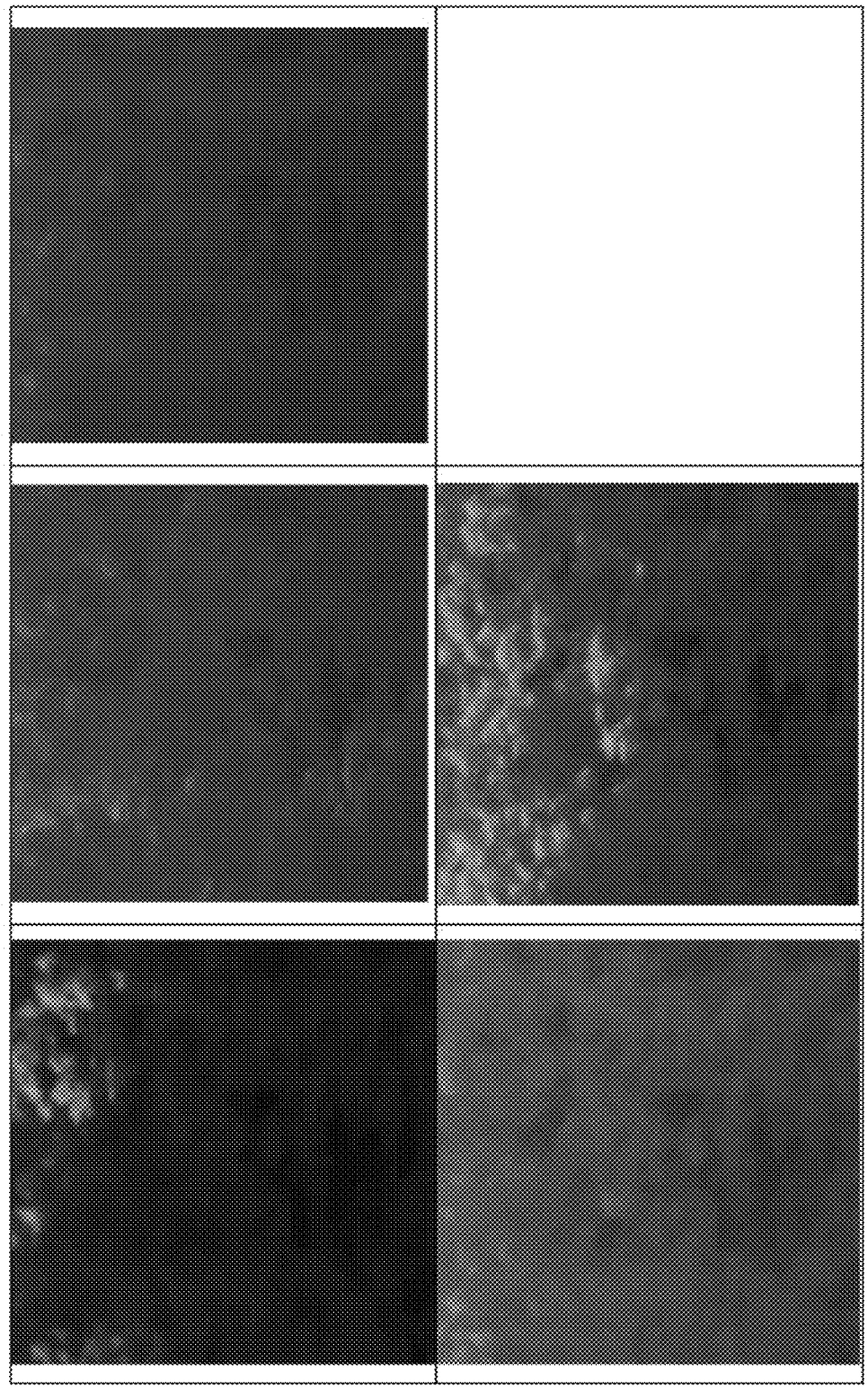
FIG. 16 shows the denoised hyperspectral images via the method of the present invention.

In the case of color image denoising, the method disclosed in the present invention has been compared with only BM3D, which is the best method in the literature. Five color images were used: Baboon, F16, House, Lena, and Peppers. FIG. 8 to FIG. 11 show the clean color images, noisy color images with denoised images using BM3D, and denoised images using our algorithm (GPCA), respectively. The average PSNR results are shown in FIG. 12. It can be seen that our method performs better BM3D under all noise levels.

Figure 17:
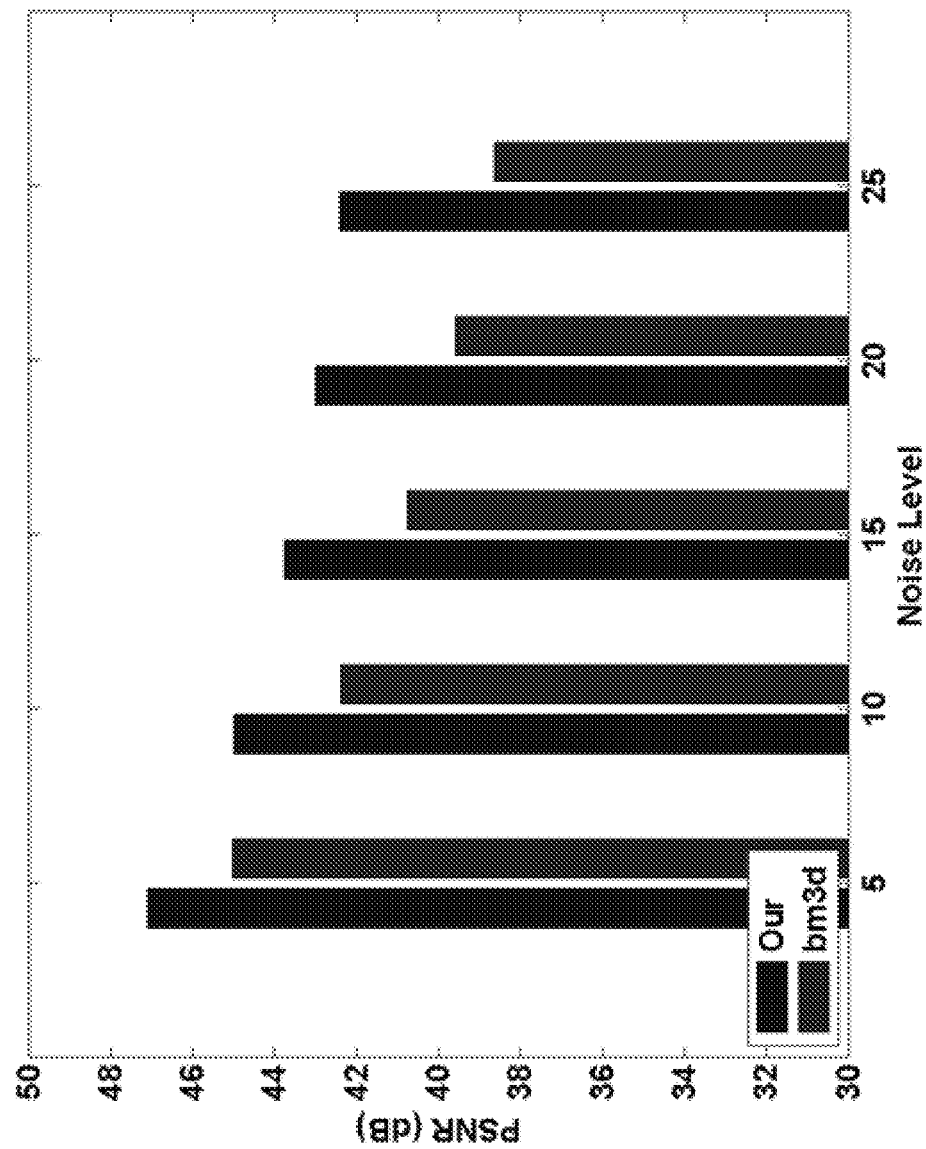
FIG. 17 is a comparison of the denoising performances of different denoising programs to the hyperspectral images, including the method of the present invention.

In the case of hyperspectral image denoising, certain denoising experiments have been conducted using 5 hyperspectral images. There are 124 bands in the hyperspectral images and we show only the $100^{th}$ band. FIG. 13 to FIG. 16 show the clean, noisy, denoised (BM3D) and denoised (our) images, respectively. FIG. 17 shows the PSNR performance. Our algorithm yielded much better performance than that of BM3D.

Figure 18:
FIG. 18 shows the denoised actual color image via the program of Adobe Lightroom.
Figure 19:
FIG. 19 shows the denoised actual color image via the method of the present invention.
Figure 20:
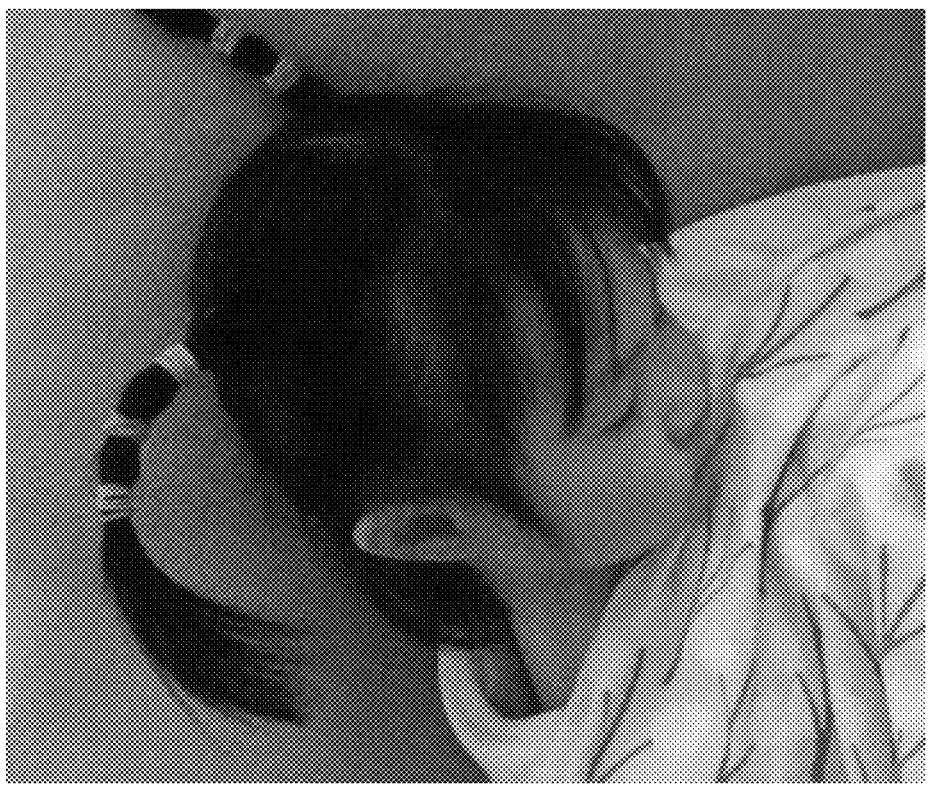
FIG. 20 shows the denoised actual color image via the method of the PhotoNinja.

Finally, as for the Images under low lighting conditions, the performance of the method disclosed in the present invention has been compared with two commercial products available on the market. The image was taken in real low lighting environments. The filtered images are shown in FIG. 18 to FIG. 20. It can be seen that our software produces the best visual performance.

Although the invention has been explained in relation to its preferred embodiment, it is to be understood that many other possible modifications and variations can be made without departing from the spirit and scope of the invention as herein described.

What is claimed is:

1. A non-transitory computer-readable medium that stores instructions executable by one or more processors to perform a method for removing noise from a noisy image, comprising
    instructions for estimating a noise level of said noisy image;
    instructions for dividing said noisy image into a plurality of blocks;
    instructions for converting said plurality of blocks to a plurality of vectors;
    instructions for grouping said plurality of vectors;
    instructions for performing a matrix recovery to remove the noise and obtain denoised vectors;
    instructions for converting said denoised vectors to denoised blocks;
    instructions for merging said denoised blocks to construct a denoised image;
    wherein, the noise is random variations of brightness or color information in said noisy image;
    instructions for performing a K-means clustering to obtain K clusters; and
    instructions for performing a hierarchical split on each of said K clusters.

2. The non-transitory computer-readable medium that stores instructions executable by one or more processors to perform the method for removing noise from the noisy image as set forth in claim 1, the step of estimating noise level comprising
    instructions for smoothing said noisy image to obtain a smoothed image;
    instructions for selecting smooth blocks from said smoothed image;
    instructions for calculating a mean pixel value for each of said smooth blocks, and rounding said mean pixel value to an integer mean pixel value, wherein said integer mean pixel values being from 0 to 255;
    instructions for grouping said smooth blocks based on said integer mean pixel value, so as to obtain a plurality of smooth block groups;
    instructions for calculating a standard deviation for each of said smooth blocks within a smooth block group;
    instructions for calculating a mean value of said standard deviation for each of said smooth blocks within a smooth block group; and
    instructions for setting said mean as a noise level for each of plurality of smooth block groups.

3. The non-transitory computer-readable medium that stores instructions executable by one or more processors to perform the method for removing noise from the noisy image as set forth in claim 2, the step of selecting smooth blocks further comprising
    instructions for only calculating a mean value of said standard deviation for each of said smooth blocks within a smooth block group, when said smooth block group comprising more than 50 smooth blocks;
    instructions for using a noise level from a neighboring smooth block group when a smooth block group does not have its own noise level; and
    instructions for obtaining a noise level lookup table with an index from 1 to 255.

4. The non-transitory computer-readable medium that stores instructions executable by one or more processors to perform the method for removing noise from the noisy image as set forth in claim 1, comprising
    instructions for determining a number of said blocks based on factors comprising image size, block size and step size; and
    instructions for setting said number of said blocks as [(w−L+1)/s]×[(h−L+1)/s], wherein w is a width of said noisy image, h is a height of said noisy image, the block size is L×L, and the step size is s.

5. The non-transitory computer-readable medium that stores instructions executable by one or more processors to perform the method for removing noise from the noisy image as set forth in claim 4, wherein
    L is set as 10; and
    s is set as 2.

6. The non-transitory computer-readable medium that stores instructions executable by one or more processors to perform the method for removing noise from the noisy image as set forth in claim 1, the step of converting said plurality of blocks to a plurality of vectors further comprising
    instructions for treating each of said blocks as a two dimensional matrix;
    instructions for treating each of said vectors as a one dimensional array;

instructions for extracting all columns from each of said two dimensional matrix; and instructions for concatenating said all columns into a single column.

7. The non-transitory computer-readable medium that stores instructions executable by one or more processors to perform the method for removing noise from the noisy image as set forth in claim 1, comprising instructions for triggering said step of performing a hierarchical split by an element-wise standard deviation of a mean normalized matrix; and instructions for triggering said step of performing a hierarchical split when said element-wise standard deviation is larger than said noise level.

8. The non-transitory computer-readable medium that stores instructions executable by one or more processors to perform the method for removing noise from the noisy image as set forth in claim 1, comprising instructions for triggering said step of performing a hierarchical split when a calculated maximum number of principal components k is larger than 6.

9. The non-transitory computer-readable medium that stores instructions executable by one or more processors to perform the method for removing noise from the noisy image as set forth in claim 1, the step of performing a matrix recovery further comprising instructions for applying a principal component analysis to a matrix of said noisy image to get a mean vector and three matrices;

instructions for estimating a number of principal components to retain, based on the noise level;

instructions for outputting said number of principal components, wherein said number of principal components is an integer number; and instructions for recovering a matrix using said number of principal components.

10. The non-transitory computer-readable medium that stores instructions executable by one or more processors to perform the method for removing noise from the noisy image as set forth in claim 1, the step of converting said denoised vectors to denoised blocks further comprising instructions for cutting a denoised vector with length L×L into L pieces, with each piece has a length L; and instructions for placing each piece to a column of a denoised block, wherein said denoised block has L columns.

11. The non-transitory computer-readable medium that stores instructions executable by one or more processors to perform the method for removing noise from the noisy image as set forth in claim 1, the step of merging said denoised blocks to construct a denoised image further comprising instructions for creating an empty image with all pixel value to be zero, wherein an element of a denoised block has a corresponding pixel in said empty image, and every element of said denoised block has its own corresponding pixel in said empty image;

instructions for adding each element in a denoised block to its own corresponding pixel in said empty image; and instructions for computing an average of each pixel by dividing an accumulated pixel value by a number of denoised blocks overlapping on said pixel.

12. A non-transitory computer-readable medium that stores instructions executable by one or more processors to perform a method for removing noise from a noisy image, comprising instructions for estimating a noise level of said noisy image;

instructions for dividing said noisy image into a plurality of blocks;

instructions for converting said plurality of blocks to a plurality of vectors;

instructions for grouping said plurality of vectors;

instructions for performing a matrix recovery to remove the noise and obtain denoised vectors;

instructions for converting said denoised vectors to denoised blocks;

instructions for merging said denoised blocks to construct a denoised image; wherein, the noise is random variations of brightness or color information in said noisy image;

the step of estimating noise level comprising, instructions for smoothing said noisy image to obtain a smoothed image;

instructions for selecting smooth blocks from said smoothed image;

instructions for calculating a mean pixel value for each of said smooth blocks, and rounding said mean pixel value to an integer mean pixel value, wherein said integer mean pixel values being from 0 to 255;

instructions for grouping said smooth blocks based on said integer mean pixel value, so as to obtain a plurality of smooth block groups;

instructions for calculating a standard deviation for each of said smooth blocks within a smooth block group;

instructions for calculating a mean value of said standard deviation for each of said smooth blocks within a smooth block group; and instructions for setting said mean as a noise level for each of plurality of smooth block groups;

the step of selecting smooth blocks further comprising, instructions for only calculating a mean value of said standard deviation for each of said smooth blocks within a smooth block group, when said smooth block group comprising more than 50 smooth blocks;

instructions for using a noise level from a neighboring smooth block group when a smooth block group does not have its own noise level; and instructions for obtaining a noise level lookup table with an index from 1 to 255; and the step of grouping said plurality of vectors further comprising, instructions for performing a K-means clustering to obtain K clusters; and instructions for performing a hierarchical split on each of said K clusters.

13. The non-transitory computer-readable medium that stores instructions executable by one or more processors to perform the method for removing noise from the noisy image as set forth in claim 12, comprising instructions for triggering said step of performing a hierarchical split by an element-wise standard deviation of a mean normalized matrix; and instructions for triggering said step of performing a hierarchical split when said element-wise standard deviation is larger than said noise level.

14. The non-transitory computer-readable medium that stores instructions executable by one or more processors to perform the method for removing noise from the noisy image as set forth in claim 12, comprising instructions for triggering said step of performing a hierarchical split when a calculated maximum number of principal components k is larger than 6.

15. The non-transitory computer-readable medium that stores instructions executable by one or more processors to perform the method for removing noise from the noisy image as set forth in claim 12, comprising instructions for determining a number of said blocks based on factors comprising image size, block size and step size; and instructions for setting said number of said blocks as [(w−L+1)/s]×[(h−L+1)/s], wherein w is a width of said noisy image, h is a height of said noisy image, the block size is L×L, and the step size is s, wherein L is set as 10, and s is set as 2.

16. The non-transitory computer-readable medium that stores instructions executable by one or more processors to perform the method for removing noise from the noisy image as set forth in claim 12, the step of converting said plurality of blocks to a plurality of vectors further comprising instructions for treating each of said blocks as a two dimensional matrix;

instructions for treating each of said vectors as a one dimensional array;

instructions for extracting all columns from each of said two dimensional matrix; and instructions for concatenating said all columns into a single column;

the step of performing a matrix recovery further comprising instructions for applying a principal component analysis to a matrix of said noisy image to get a mean vector and three matrices;

instructions for estimating a number of principal components to retain, based on the noise level;

instructions for outputting said number of principal components, wherein said number of principal components is an integer number; and instructions for recovering a matrix using said number of principal components;

the step of converting said denoised vectors to denoised blocks further comprising instructions for cutting a denoised vector with length L×L into L pieces, with each piece has a length L; and instructions for placing each piece to a column of a denoised block, wherein said denoised block has L columns; and the step of merging said denoised blocks to construct a denoised image further comprising instructions for creating an empty image with all pixel value to be zero, wherein an element of a denoised block has a corresponding pixel in said empty image, and every element of said denoised block has its own corresponding pixel in said empty image;

instructions for adding each element in a denoised block to its own corresponding pixel in said empty image; and instructions for computing an average of each pixel by dividing an accumulated pixel value by a number of denoised blocks overlapping on said pixel.

17. A non-transitory computer-readable medium that stores instructions executable by one or more processors to perform a method for removing noise from a noisy image, comprising instructions for estimating a noise level of said noisy image;

instructions for dividing said noisy image into a plurality of blocks;

instructions for converting said plurality of blocks to a plurality of vectors;

instructions for grouping said plurality of vectors;

instructions for performing a matrix recovery to remove the noise and obtain denoised vectors;

instructions for converting said denoised vectors to denoised blocks;

instructions for merging said denoised blocks to construct a denoised image;

wherein, the noise is random variations of brightness or color information in said noisy image;

instructions for determining a number of said blocks based on factors comprising image size, block size and step size;

instructions for setting said number of said blocks as [(w−L+1)/s]×[(h−L+1)/s], wherein w is a width of said noisy image, h is a height of said noisy image, the block size is L×L, and the step size is s, wherein L is set as 10, and s is set as 2;

the step of estimating noise level comprising, instructions for smoothing said noisy image to obtain a smoothed image;

instructions for selecting smooth blocks from said smoothed image;

instructions for calculating a mean pixel value for each of said smooth blocks, and rounding said mean pixel value to an integer mean pixel value, wherein said integer mean pixel values being from 0 to 255;

instructions for grouping said smooth blocks based on said integer mean pixel value, so as to obtain a plurality of smooth block groups;

instructions for calculating a standard deviation for each of said smooth blocks within a smooth block group;

instructions for calculating a mean value of said standard deviation for each of said smooth blocks within a smooth block group; and instructions for setting said mean as a noise level for each of plurality of smooth block groups;

the step of selecting smooth blocks further comprising, instructions for only calculating a mean value of said standard deviation for each of said smooth blocks within a smooth block group, when said smooth block group comprising more than 50 smooth blocks;

instructions for using a noise level from a neighboring smooth block group when a smooth block group does not have its own noise level; and instructions for obtaining a noise level lookup table with an index from 1 to 255;

the step of grouping said plurality of vectors further comprising, instructions for performing a K-means clustering to obtain K clusters; and instructions for performing a hierarchical split on each of said K clusters;

the step of converting said plurality of blocks to a plurality of vectors further comprising instructions for treating each of said blocks as a two dimensional matrix;

instructions for treating each of said vectors as a one dimensional array;

instructions for extracting all columns from each of said two dimensional matrix; and instructions for concatenating said all columns into a single column;

the step of performing a matrix recovery further comprising instructions for applying a principal component analysis to a matrix of said noisy image to get a mean vector and three matrices;

instructions for estimating a number of principal components to retain, based on the noise level;

instructions for outputting said number of principal components, wherein said number of principal components is an integer number; and instructions for recovering a matrix using said number of principal components;

the step of converting said denoised vectors to denoised blocks further comprising instructions for cutting a denoised vector with length L×L into L pieces, with each piece has a length L; and instructions for placing each piece to a column of a denoised block, wherein said denoised block has L columns; and the step of merging said denoised blocks to construct a denoised image further comprising instructions for creating an empty image with all pixel value to be zero, wherein an element of a denoised block has a corresponding pixel in said empty image, and every element of said denoised block has its own corresponding pixel in said empty image;

instructions for adding each element in a denoised block to its own corresponding pixel in said empty image; and instructions for computing an average of each pixel by dividing an accumulated pixel value by a number of denoised blocks overlapping on said pixel.

18. The non-transitory computer-readable medium that stores instructions executable by one or more processors to perform the method for removing noise from the noisy image as set forth in claim 17, comprising instructions for triggering said step of performing a hierarchical split by an element-wise standard deviation of a mean normalized matrix; and instructions for triggering said step of performing a hierarchical split when said element-wise standard deviation is larger than said noise level.

19. The non-transitory computer-readable medium that stores instructions executable by one or more processors to perform the method for removing noise from the noisy image as set forth in claim 17, comprising instructions for triggering said step of performing a hierarchical split when a calculated maximum number of principal components k is larger than 6.

* * * * *